(12) United States Patent
Schedler et al.

(10) Patent No.: US 7,670,681 B2
(45) Date of Patent: Mar. 2, 2010

(54) MATERIAL COMPOSITE AND METHOD OF PRODUCING THE COMPOSITE

(75) Inventors: Bertram Schedler, Reutte (AT); Thomas Huber, Lechaschau (AT); Thomas Friedrich, Halblech (DE); Dietmar Schedle, Reutte (AT); Anton Zabernig, Reutte (AT); Karlheinz Scheiber, Breitenwang (AT); Hans-Dieter Friedle, Häselgehr (AT)

(73) Assignee: Plansee SE, Reutte (AT)

( * ) Notice: Subject to any disclaimer, the term of this patent is extended or adjusted under 35 U.S.C. 154(b) by 1217 days.

(21) Appl. No.: 11/218,002

(22) Filed: Sep. 1, 2005

(65) Prior Publication Data

US 2006/0052249 A1  Mar. 9, 2006

(30) Foreign Application Priority Data

Sep. 6, 2004  (AT)  ................ GM659/2004

(51) Int. Cl.
  *C04B 37/02* (2006.01)
  *B32B 15/04* (2006.01)
  *B23K 1/00* (2006.01)
  *G21B 1/00* (2006.01)
  *F28F 21/02* (2006.01)

(52) U.S. Cl. ............ 428/408; 428/548; 428/615; 428/646; 428/660; 428/666; 29/890.03; 427/228; 427/229; 427/201; 228/124.5; 228/196; 165/168; 165/181

(58) Field of Classification Search ............ 228/124.5, 228/121, 178, 179, 183, 196; 428/554, 553, 428/457, 627; 29/419.1, 800.93; 165/168, 165/181; 427/229, 193, 376.6; 148/40 S, 148/411, 432

See application file for complete search history.

(56) References Cited

U.S. PATENT DOCUMENTS

| 4,358,506 | A |   | 11/1982 | Intrater et al. |
| 5,410,796 | A |   | 5/1995 | Weeks, Jr. |
| 5,533,258 | A | * | 7/1996 | Rainer et al. ............ 29/890.03 |
| 5,806,588 | A |   | 9/1998 | Weeks, Jr. et al. |
| 5,855,313 | A |   | 1/1999 | McAfee et al. |
| 5,904,287 | A |   | 5/1999 | Tashiro et al. |
| 6,443,354 | B1 |  | 9/2002 | Plochl et al. |

FOREIGN PATENT DOCUMENTS

| AT | 003 175 U1 |   | 11/1999 |
| EP | 0 115 577 A1 |  | 8/1984 |
| EP | 0 638 530 A1 |  | 2/1995 |
| EP | 0 663 670 A1 |  | 7/1995 |
| EP | 0 663 670 B1 |  | 11/1996 |
| JP | 60026633 | * | 2/1985 |
| JP | 01-308884 |  | 12/1989 |
| JP | 02026880 | * | 1/1990 |
| WO | 2005/037734 A1 |  | 4/2005 |

OTHER PUBLICATIONS

Appendino, et al.: "Joining of C/C Composite to Copper", Fusion Engineering and Design 66-68, Elsevier Science B.V. 2003, www.sciencedirect.com, XP 4456477A, pp. 225-229.
Appendino, et al.: "Direct Joining of CFC to Copper", Journal of Nuclear Materials, 329-333, Elsevier B.V. 2004, www.sciencedirect.com, XP 4795856A, pp. 1563-1566.

* cited by examiner

*Primary Examiner*—Stanley Silverman
*Assistant Examiner*—Kallambella Vijayakumar
(74) *Attorney, Agent, or Firm*—Laurence A. Greenberg; Werner H. Stemer; Ralph E. Locher

(57) ABSTRACT

A material composite has at least one region of copper or a copper alloy, at least one region of a predominantly graphitic material, and at least one boundary region between them. The boundary region has one or more carbides from the group of the $IV^b$, $V^b$, $VI^b$ transition metals and one or more elements of the group consisting of Si, B, Al, Ge, Mn, Sn. In a preferred implementation of the invention, the composite is produced with a back-casting process.

19 Claims, No Drawings

MATERIAL COMPOSITE AND METHOD OF PRODUCING THE COMPOSITE

BACKGROUND OF THE INVENTION

Field of the Invention

The invention relates to a material composite which comprises at least one region of copper or a copper alloy, at least one region of a predominantly graphitic material, and at least one boundary region located between them. The invention further pertains to a process for producing the composite.

Typical examples for the use of such material composites are cooling devices, for example diverters and limiters for fusion reactors. Such material composites typically comprise regions of pure copper, for example low-oxygen copper (OFHC), and regions of graphite, for example graphite reinforced with carbon fibers (CFC), which are integrally joined to one another. The integral bonding can be effected by back-casting, as is described, for example, in U.S. Pat. No. 5,533,258 and European Patent EP 0 663 670 B1. However, soldering or pressure-aided joining techniques (e.g. HIP) can also be used.

The boundary or joint areas of the copper region and the graphite region which delimit the boundary region can be flat or curved. An example of a flat design is a flat brick diverter. A curved boundary area is present, for example, in the case of a tube diverter element. Here, the graphite part has a hole whose wall is integrally joined to pure copper which in turn is integrally joined to a tube of a copper alloy (e.g. Cu—Cr—Zr) wherein coolant flows. The pure copper which is integrally joined to the graphitic material has the function of ensuring heat removal. In addition, it can also assume the function of stress dissipation, as is the case when graphite is joined via a pure copper intermediate layer to a high-strength copper alloy (e.g. Cu—Cr—Zr). Apart from the regions of graphite and one or more copper materials, such cooling devices can also have further regions, for example of steel or a tungsten alloy (e.g. W-1% by weight of $La_2O_3$).

In each case, the boundary region between graphite and copper represents the weak point of such material composites. A method of producing cooling devices having improved strength in the boundary region is described in the abovementioned U.S. Pat. No. 5,533,258 and European Patent EP 0 663 670 B1. There, the metal of the cooling device is brought in the molten state into contact with the parts of a heat-resistant material, with amounts of one or more metals of transition groups IV and/or V of the Periodic Table being made available in the boundary region during the joining procedure. Material composites produced in this way, in particular CFC-copper composites, have a significantly improved strength. For material composites which are subjected to high stresses, for example cooling elements for fusion reactors, it is desirable to increase this strength level still further.

SUMMARY OF THE INVENTION

It is accordingly an object of the invention to provide a material composite and a production method which overcome the above-mentioned disadvantages of the heretofore-known devices and methods of this general type and which provides for a material composite with improved strength, in particular higher strength in the copper/graphite boundary region.

With the foregoing and other objects in view there is provided, in accordance with the invention, a material composite, comprising:
at least one first region of copper or a copper alloy;
at least one second region of a predominantly graphitic material; and
at least one boundary region between said first region and said second region, said boundary region containing one or more elements selected from the group consisting of Si, B, Al, Ge, Sn, Mn, and at least one carbide of one or more elements selected from the group of $IV^b$, $V^b$, $VI^b$ transition metals.

The material composites of the invention comprises a region of copper or a copper alloy, a region of a predominantly graphitic material and a boundary region located in between. For the purposes of the present invention, the boundary region is that region where the copper/copper alloy is integrally joined to the graphitic material. The boundary region is bounded by the boundary areas of the materials to be joined and, apart from these boundary areas, further comprises phase constituents which are introduced between the join partners or form during the joining process. The boundary region according to the invention comprises one or more carbides or mixed carbides formed from at least one element of the group of $IV^b$, $V^b$, $VI^b$ transition metals and one or more elements of the group consisting of Si, B, Al, Ge, Sn, Mn. The bonding form wherein Si, B, Al, Ge, Sn and Mn occur is unimportant. Thus, these elements have been detected in composite materials according to the invention in the form of a carbidic compound, as intermetallic phase, in this case once again preferably together with an element of the $IV^b$, $V^b$, $VI^b$ transition metals, in elemental form and/or as solution.

According to the prior art (U.S. Pat. No. 5,533,258 and EP 0 663 670 B1), only a strongly carbide-forming element, preferably titanium, has to date been introduced into the boundary region between copper and the graphitic material. This process is also referred to as activation. During the joining process, e.g. during back-casting, a contiguous titanium carbide layer is formed on the graphitic material and this has a favorable influence on the ability to be wetted by copper. The activation by means of titanium results in a very high strength in the copper/titanium carbide interface. However, the zone wherein the titanium carbide goes over into the graphitic material always forms a weak point.

It has now surprisingly been found that activation with one or more elements of the group of the $IV^b$, $V^b$, $VI^b$ transition metals and one or more elements of the group consisting of Si, B, Al, Ge, Sn, Mn which are among weakly carbide-forming elements, to form a carbide or mixed carbide of one or more elements of the group of the $IV^b$, $V^b$, $VI^b$ transition metals makes it possible to achieve a significant increase in the bond strength, in particular the shear strength in the boundary region which is determined mainly by the strength of the zone where the titanium carbide goes over into the graphitic material. The phase regions of the Si, B, Al, Ge, Sn and/or Mn carbides and/or intermetallic phases of the abovementioned carbide-forming elements are advantageously present as islands.

Particularly advantageous, strongly carbide-forming elements include Y, Ti, V and Mo, with the best results being able to be achieved using Ti. Basically, it should be mentioned that the weakly and strongly carbide-forming elements can also be present in elemental form in the boundary region. In addition, they can be present in the graphitic material (e.g. as carbide) and in the copper/copper alloy (e.g. as a solution or as precipitates), advantageously in a higher concentration in the respective boundary areas.

The best results were achieved by means of a Ti and Si activation with TiC, $Ti_5Si_3$ and SiC being present in the join zone. In this case, the shear strength in the boundary region is greater than that of CFC.

Owing to the high thermal conductivity of graphite reinforced with carbon fibers (CFC) and pure copper, for example OFHC copper, this material pairing is particularly suitable for producing the material composite of the invention. The CFC can in this case also contain proportions of SiC or other phase constituents which have a good thermal conductivity. The bond strength between the predominantly graphitic material and copper/copper alloy can be improved by structuring of the predominantly graphitic material. The structuring can, for example, be achieved by means of holes produced by means of a laser.

A particularly useful process for producing the material composite of the invention is back-casting. In the back-casting process, copper/the copper alloy in the molten state is brought into contact with the graphite. This is carried out in a mold made of a heat-resistant material, with the negative contour of the mold corresponding approximately to the positive contour of the material composite.

The elements of the group of the $IV^b$, $V^b$, $VI^b$ transition metals, Si, B, Al, Ge, Sn and Mn can, for example, be introduced by coating one or both join partners or else by laying one or more foils between the join partners. Suitable coating methods are, for example, electrolytic processes but also CVD and PVD processes. The elements of the group of the $IV^b$, $V^b$, $VI^b$ transition metals, Si, B, Al, Ge, Sn and Mn are preferably present in the layer or in the foil in elemental form. Nonvariant transformations associated with a lowering of the solidus and liquidus temperatures occur between the elements of the group of the $IV^b$, $V^b$, $VI^b$ transition metals and Si, B, Al, Ge, Sn, Mn, which leads to improved wetting behavior.

However, these elements can in principle also be present in another form, for example as a compound or alloy. However, the energy of formation of the compounds of the $IV^b$, $V^b$, $VI^b$ transition metals has to be less than the energy of formation of the respective carbide.

If introduction is effected by means of coating, it is advantageous for the layer to be deposited on the graphitic part. This ensures intimate contact between the carbide-forming element and the carbon source, viz. the graphite. A thickness range of from 10 to 50 μm has been found to be appropriate for the layer/foil. In a separate process step, the carbide-forming elements can also be melted or partly converted into carbide. It is advantageous for the proportion of an element of the group consisting of Si, B, Al, Ge, Sn, Mn based on the proportion of an element of the group of the $IV^b$, $V^b$, $VI^b$ transition metals to be selected so that the alloy formed therefrom comprises proportions of eutectic phase.

In addition, it has been found to be advantageous for one or more weakly carbide-forming elements of the group consisting of Si, B, Al, Ge, Sn, Mn to be deposited in elemental form on the graphitic part or to be applied as elemental foil to the graphitic part. In a further step, the graphitic part and a layer/foil are heated to a temperature above the melting point of the weakly carbide-forming element. When an alloy layer or alloy foil is present, the graphitic part and layer/foil are heated to at least a temperature greater than the solidus temperature. When an alloy comprising, for example, two or more carbide-forming elements is used, it is advantageous to employ alloys having eutectic microstructure constituents.

Eutectic or near-eutectic alloys are particularly advantageous.

If more than one carbide-forming element is used, the process can also be carried out in a plurality of stages.

A particularly high strength of the bond between graphite and copper/copper alloy can be achieved by coating a graphitic material with Si or Ge, with the coating surface having a surface structure. Coating with Si can, for example, be effected by applying a silicon-containing slurry to the graphitic part. The part which has been coated in this way is then heated to a temperature above the melting point of Si under protective gas or under reduced pressure. A strongly carbide-forming element, preferably Ti, is applied, for example in the form of a foil, to the part which has been produced in this way. The proportion of Si and the proportion of Ti are preferably selected so that eutectic microstructure constituents are formed when they react. In a further process step, the Ti foil is melted under protective gas or under reduced pressure. However, the melting of the Si and of the Ti can also be carried out in one process step. In this case, the temperature has to be at least above the solidus temperature of the respective alloy.

The melt then penetrates into the micropores or into the macroholes of the structured surface of the graphite. This results in partial reaction of the Ti with the C of the graphite part to form TiC. Si, as the more weakly carbide-forming element, reacts to only a minor extent with C and together with Ti forms the intermetallic phase $Ti_5Si_3$. In addition, small proportions of $SiO_2$ can be detected, which is presumably attributable to adsorbed oxygen or small amounts of O in the process atmosphere. The graphite part which has been pretreated in this way is placed in a mold made of heat-resistant material and its treated surface is covered with the desired amount of copper or a copper alloy. The total composite is then heated until the copper/copper alloy liquefies. The metallic Ti present dissolves in the copper melt within a short time. After solidification of the copper or the copper alloy, a strong and intimate bond between copper and the copper alloy and the graphitic part is obtained, with Ti being concentrated in the Cu in the boundary area region.

The material composite of the invention is advantageously used as cooling element and in this case preferably as diverter or limiter in a fusion reactor.

Although the invention is illustrated and described herein as embodied in a material composite, it is nevertheless not intended to be limited to the details shown, since various modifications and structural changes may be made therein without departing from the spirit of the invention and within the scope and range of equivalents of the claims.

The construction of the invention, however, together with additional objects and advantages thereof will be best understood from the following description of specific production examples:

EXAMPLE

To produce material composites according to the invention, prismatic parts of fiber-reinforced graphite (CFC) having the dimensions 200×100×50 mm³ were structured on the 200×100 mm² side face by introduction of holes running perpendicular to the surface and having a diameter of about 100 μm by means of a laser. After cleaning the graphite part, a slurry wherein, depending on the experiment, various, weakly carbide-forming elements had been dispersed was applied to the surface which had been structured in this way. The amount applied was calculated so that it corresponded theoretically to a dense covering with the respective element of 6 μm. The elements used are shown in Table 1 below. The parts which had been treated in this way were heated at a temperature which was 40° C. above the liquidus temperature of the respective weakly carbide-forming element for 60 minutes under reduced pressure. In a further process step, the treated surface was, depending on the experiment, covered with a 20 µm thick titanium or vanadium foil and the part was once again heated to a temperature of 1720° C. (Ti) or 1950° C. (V) under reduced pressure. The hold time at temperature was 60 minutes. After cooling to room temperature, a copper block having the dimensions 200×100×50 mm³ which had been cleaned by means of ultrasound was positioned on the Ti- or V-covered region and this stack was introduced into a graphite mold whose length and width corresponded substantially to the length (200 mm) and width (100 mm) of the material stack. The material stack was then heated to 1150° C. in an inductively heated furnace. After the material composite produced in this way had been taken from the furnace, it was subjected to a shear test. For comparison, prior art material composites were produced without introduction of weakly carbide-forming elements in an otherwise identical process sequence. In the shear test, the material composites produced according to the invention (Examples 3 to 8) displayed a significantly improved shear strength compared to the prior art (Examples 1 and 2).

| Example number | Part produced according to: | Weakly carbide-forming element | Strongly carbide-forming element | Shear strength [MPa] |
| --- | --- | --- | --- | --- |
| 1 | prior art | — | Ti | 33 |
| 2 | prior art | — | V | 25 |
| 3 | invention | Si | Ti | 67 |
| 4 | invention | Ge | Ti | 70 |
| 5 | invention | Al | Ti | 49 |
| 6 | invention | Si | V | 54 |
| 7 | invention | Ge | V | 54 |
| 8 | invention | Al | V | 44 |

This application claims the priority, under 35 U.S.C. § 119, of Austrian application AT GM 659/2004, filed Sep. 6, 2004; the entire disclosure of the prior application is herewith incorporated by reference.

We claim:

1. A material composite, comprising:
   at least one first region of copper or a copper alloy;
   at least one second region of a predominantly graphitic material; and
   at least one boundary region between said first region and said second region, said boundary region containing one or more elements selected from the group consisting of Si, B, Al, Ge, Sn, Mn, and at least one carbide of one or more elements selected from the group of $IV^b$, $V^b$, $VI^b$ transition metals, and a carbide or mixed carbide of one or more elements selected from the group consisting of Si, B, Al, Ge, Sn, Mn; and
   wherein at least one carbide is present in form of islets.

2. The material composite according to claim 1, wherein said boundary region comprises one or more elements selected from the group consisting of Si, B, Al, Ge, Sn, Mn in the form of at least one of a carbidic compound, an intermetallic phase, in dissolved form, and/or in elemental form.

3. The material composite according to claim 1, wherein said boundary region comprises at least one carbide or mixed carbide of at least one of the elements Ti, V, and Mo.

4. The material composite according to claim 1, wherein at least one element of the group of the $IV^b$, $V^b$, $VI^b$ transition metals, Si, B, Al, Ge, Sn, Mn is dissolved in the copper or the copper alloy.

5. The material composite according to claim 4, wherein the element of the group of the $IV^b$, $V^b$, $VI^b$ transition metals, Si, B, Al, Ge, Sn, Mn is concentrated in the region of the copper boundary area.

6. The material composite according to claim 1, wherein said boundary region comprises Ti carbide.

7. The material composite according to claim 1, wherein said boundary region comprises one or both of Si and Ge.

8. The material composite according to claim 1, wherein said boundary region comprises Ti carbide and Si carbide.

9. The material composite according to claim 1, wherein said boundary region comprises one or more elements of the group of the $IV^b$, $V^b$, $VI^b$ transition metals, Si, B, Al, Ge, Sn, Mn in elemental form.

10. The material composite according to claim 1, wherein said boundary region comprises at least one intermetallic phase of one or more elements of the group consisting of Si, B, Al, Ge, Sn, Mn with one or more elements of the group of the $IV^b$, $V^b$, $VI^b$ transition metals.

11. The material composite according to claim 1, wherein one or more elements of the group of the $IV^b$, $V^b$, $VI^b$ transition metals, Si, B, Al, Mn, Ge, Sn are present in the region composed of the predominantly graphitic material.

12. The material composite according to claim 1, wherein said boundary region has a thickness of from 0.05 to 30 µm.

13. The material composite according to claim 1, wherein said at least one carbide does not form a contiguous layer in said boundary region.

14. The material composite according to claim 1, wherein said second region comprises graphite reinforced with carbon fibers (CFC).

15. The material composite according to claim 1, wherein said second region is structured with bores formed in a boundary surface thereof.

16. The material composite according to claim 1, wherein said first region comprises low-oxygen copper (OFHC).

17. The material composite according to claim 1, configured as a cooling element.

18. The material composite according to claim 17, configured as a first wall component in a fusion reactor.

19. In combination with a fusion reactor, a diverter or a limiter formed of the material composite according to claim 1.

* * * * *